Aug. 5, 1924.
C. C. DAVIS
ART OF WORKING DUSTY FIELDS
Filed July 24, 1920
1,503,641
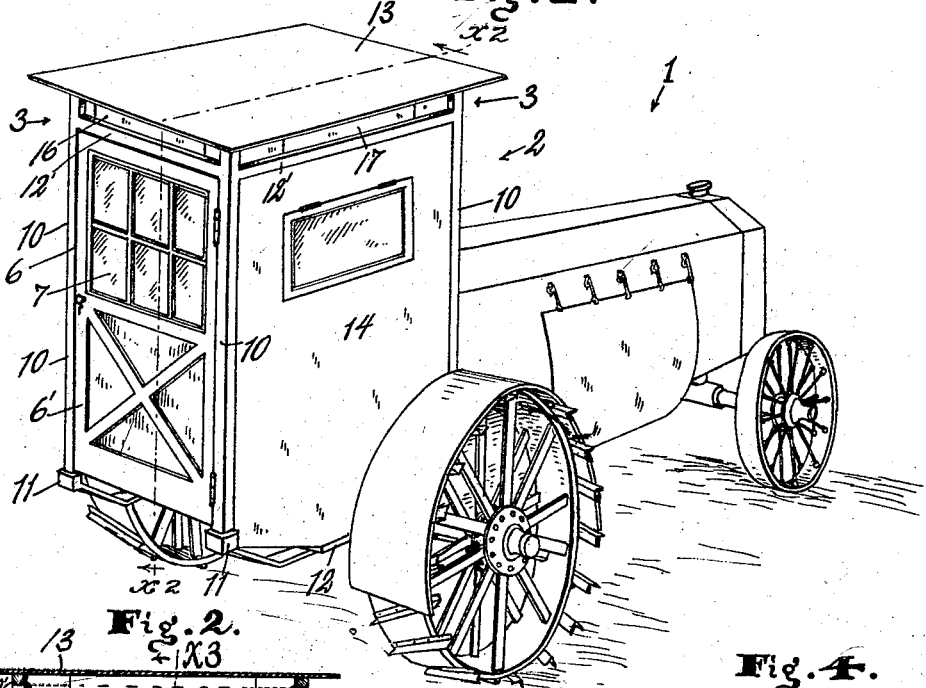
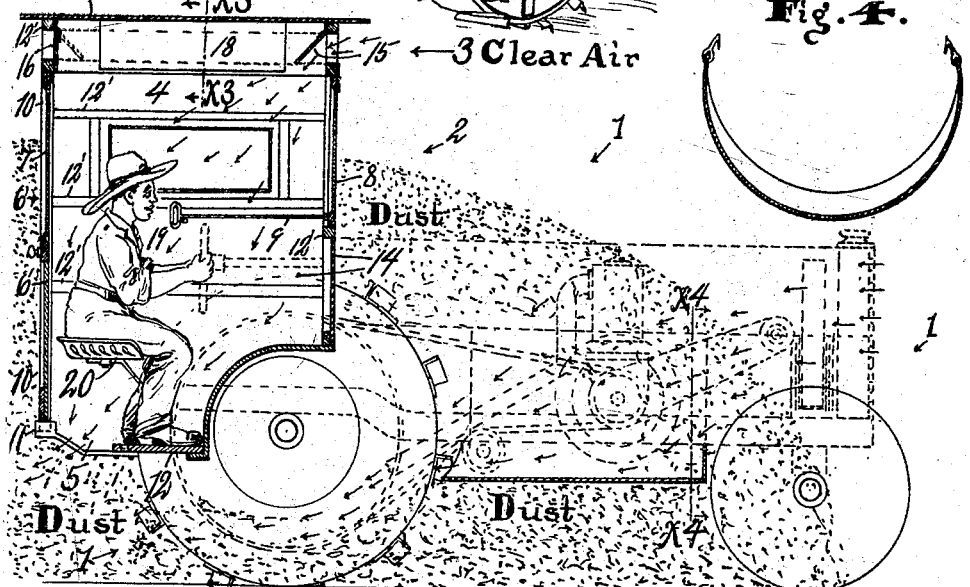
Inventor.
Charles Cassat Davis.
by James R. Townsend
his atty
Witness:
W. M. Gentle Patented Aug. 5, 1924.

1,503,641

UNITED STATES PATENT OFFICE.

CHARLES CASSAT DAVIS, OF LOS ANGELES, CALIFORNIA.

ART OF WORKING DUSTY FIELDS.

Application filed July 24, 1920. Serial No. 398,737.

*To all whom it may concern:*

Be it known that I, CHARLES CASSAT DAVIS, a citizen of the United States, residing at Los Angeles, in the county of Los Angeles and State of California, have invented a new and useful Improvement in the Art of Working Dusty Fields, of which the following is a specification.

This invention is particularly intended to be used in connection with tractors in dusty soils.

In the Antelope, Imperial, and other valleys of California, as well as in other western and Southwestern States, the tractor has come into large use for plowing and cultivating fields in which the soil is made up to a greater or less extent of an impalpable dust which is stirred up by grousers on the traction wheels and forms a blinding cloud that envelops the machine and the driver and in some instances is almost intolerable; tending to clog the lungs and cause affections of the eyes and of the mucous membrane. Such clouds of dust are also produced to a large extent in the operations of plowing and cultivating with teams and until my present invention there has appeared to be no remedy.

In seeking for a remedy I have discovered that the cloud of dust immediately around the tractor or a team is limited as to height and my invention comprises broadly the provision of a canopy or cover closed at front, back and sides extending from the tractor frame upward to a level above that to which the dust rises, and providing said canopy or cover at the top with ventilating means to admit pure air; the lower part of the enclosure being provided with an outlet for such air.

I make provision whereby a downward air pressure is maintained within the canopy, cab or cover, and such pressure may be produced by any suitable means as a ventilating fan; but in actual practice such means for producing a pressure is provided by an arrangement of automatic valves which are preferably flaps acted upon by the wind whereby air enters the top at the windward side of the cover and escapes at the bottom of the cover, thus holding down and driving out any dust that otherwise would enter the space around the driver and the mechanism of the tractor.

The invention is broadly new, basic and primary in that I provide a tractor with a cab extending above the dust level which is common to the tractor in its operation in dusty fields, and provide the cab above said level with means to supply air to the interior of the cab; said cab being provided with an outlet at the bottom and otherwise normally closed, so that a down-draft from top to bottom of the cab is produced for the purpose of excluding dust from the tractor driver and from the mechanism of the tractor.

Another feature of the invention resides in the arranging of oppositely disposed valved air inlets; each being provided with a flap adapted to be opened by wind pressure or ordinary disturbances of the atmosphere upon the outside of the cab and closed by air pressure on the inside of said cab. Such an arrangement is also applicable to the ventilation of buildings of larger and more pretentious character than the tractor cab, and may also be applied to minor uses and I do not limit the use of my invention to the tractor.

The principal object, however is to make the plowing and cultivating of dusty fields less disagreeable, difficult and dangerous.

The invention comprises causing around a workman in a dusty field, a down-draft of air from the pure air above the dust level and excluding the dust from entering at the sides of such down-draft.

In this improvement I cause an air pressure around the workman by means of air introduced from the pure air zone above the dust level and relieve such pressure below the level of the workman thus excluding dust from the workman.

Other objects, advantages and features of invention may appear from the accompanying drawing, the subjoined detail description and the appended claim.

The accompanying drawing illustrates the invention.

Figure 1 is a perspective view of this invention applied to a tractor.

Fig. 2 is a longitudinal sectional elevation of the cab applied to a tractor which is diagrammatically indicated.

Fig. 3 is an enlarged sectional detail of the ventilating means at the top.

Fig. 4 is a cross section of the hood adapted to form the draft chamber underneath the tractor mechanism and supplied with air by the radiator fan of the tractor engine.

The implement as the tractor 1 may be of any suitable character. The cab, canopy cover or enclosure 2 may be of any suitable construction provided at the upper part of its walls with ventilating means 3 adapted for the production of air pressure within the chamber 4 of the cab, and above the unobstructed draft outlet 5 in the form of an opening in the bottom of the chamber, said outlet opening from the chamber directly into the atmosphere below the cab. Said chamber 4 is of sufficient size to accommodate the driver of the tractor and is provided with a doorway 6, and a door 6' by which the doorway may be closed and opened by the driver. The door of the cab may be provided with a window as at 7 and the front wall of the cab may also be provided with a window as at 8; said front window being adapted by means of a handle 9 to be swung forwardly into open position, whenever that may be desired. The windows 7 and 8 are transparent to enable the driver to look through them; and other windows for the same purpose may be provided as desired.

In the drawing the cover or cab is shown as oblong extending from the rear end of the tractor and intended to accommodate the driver. It may be made as roomy or as contracted as the conditions or the pleasure of the constructor may make appropriate.

In the form shown in Figs. 1 and 2 the canopy comprises a frame constructed with corner posts 10 adapted to be held in sockets 11 with which the implement frame 12 is provided; and which sockets are adapted to hold the corner posts upright. Said corner posts form the supports for the frame, and are connected together by any suitable form of framing 12' to support the top 13 and walls 14.

The flaps 15, 16, 17 and 18 are hinged at their upper edges to the frame and swing downwardly and out against the wall of the cab to a perpendicular or closed position; and up and in, to open position.

The top 13 is preferably extended laterally above the ventilator openings so as to assist in directing the wind into the ventilator openings.

The location of the driver's station 19 is pre-determined in the cab by suitable means as the driver's seat 20 and while the driver is at his station and the wind is blowing from any direction, the enclosure will be kept free from dust.

In practical operation in dusty fields, the driver enters the cab to operate the tractor; and having closed the door and the window, will operate the tractor in the usual way; thus causing the dust to arise as indicated in the drawing.

The wind blowing in any direction against a ventilating flap 15, 16, 17 or 18 will swing such flap in and allow the clear air to enter and produce pressure inside the cab. This pressure finds vent directly into the atmosphere at the bottom opening or outlet 5, the down draft thus produced prevents the dust from entering at the lower opening in the floor of the cab.

I claim:

The combination of a tractor propelled agricultural appliance which in operation produces a cloud of dust; an enclosure on said appliance that is closed at the top, front, back and sides with the top extended above the dust level; of air inlets and flaps at the top of the front, back and sides of the enclosure, said flaps being arranged perpendicularly on the inside of the enclosure and adapted to be operated by the wind to open one or more of the inlets inwardly, and by gravity and air pressure inside the enclosure to close the opposite flaps; and an air discharge outlet at the rear and through the bottom of said enclosure.

In testimony whereof, I have hereunto set my hand at Los Angeles, California, this 16th day of July, 1920.

CHARLES CASSAT DAVIS.

Witness:
JAMES R. TOWNSEND.